United States Patent
Stelmar Netto et al.

(10) Patent No.: US 11,055,195 B1
(45) Date of Patent: Jul. 6, 2021

(54) ORCHESTRATING AN INTERRUPTION DURING INSTALLATION OF SENSOR-BASED DEVICES

(71) Applicant: International Business Machines Corporation, Armonk, NY (US)

(72) Inventors: Marco Aurelio Stelmar Netto, São Paulo (BR); Vagner Figueredo de Santana, São Paulo (BR); Renato Luiz de Freitas Cunha, São Paulo (BR); Bruno Silva, São Paulo (BR); Fernando Luiz Koch, Greenwich, CT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/786,170

(22) Filed: Feb. 10, 2020

(51) Int. Cl.
*G06F 11/34* (2006.01)
*G06F 17/18* (2006.01)
*G06F 11/32* (2006.01)

(52) U.S. Cl.
CPC ........ *G06F 11/3452* (2013.01); *G06F 11/327* (2013.01); *G06F 17/18* (2013.01)

(58) Field of Classification Search
CPC ...... G06F 11/00; G06F 11/004; G06F 11/006; G06F 11/30; G06F 11/3003; G06F 11/3093; G06F 11/32; G06F 11/324; G06F 11/327; G06F 11/328; G06F 11/3051; G06F 11/34; G06F 11/3452; G06F 17/00; G06F 17/18
See application file for complete search history.

(56) References Cited

U.S. PATENT DOCUMENTS

| | | | | |
|---|---|---|---|---|
| 6,020,815 | A * | 2/2000 | Eslambolchi | B61L 1/06 246/292 |
| 6,609,090 | B1 * | 8/2003 | Hickman | G06Q 10/087 704/9 |
| 10,096,236 | B1 | 10/2018 | Trundle | |
| 10,810,525 | B1 * | 10/2020 | Cruickshank, III | G06Q 10/063116 |
| 2016/0283304 | A1 * | 9/2016 | Horikawa | G06F 11/3409 |
| 2018/0247123 | A1 | 8/2018 | Harper et al. | |
| 2018/0285130 | A1 | 10/2018 | Chakra et al. | |
| 2018/0321951 | A1 | 11/2018 | Fitzgerald et al. | |
| 2019/0026091 | A1 * | 1/2019 | Gao | G06F 8/71 |

* cited by examiner

*Primary Examiner* — Boris D Grijalva Lobos
(74) *Attorney, Agent, or Firm* — Cantor Colburn LLP; Joseph Petrokaitis (57) ABSTRACT

Aspects of the invention include a computer-implemented method that includes detecting, by a processor, a performance of a step of an installation protocol for a sensor-based device. The processor performs a negative outcome analysis comprising determining a likelihood that the performance of the step will cause a negative outcome. Based at least in part on a result of the negative outcome analysis, an interruption alarm is issued.

17 Claims, 7 Drawing Sheets

FIG. 7

ORCHESTRATING AN INTERRUPTION DURING INSTALLATION OF SENSOR-BASED DEVICES

BACKGROUND

The present invention generally relates to programmable computers, and more specifically, to programmable computer systems configured to orchestrate an interruption during an installation of a sensor-based device.

Smart sensors/devices collect inputs from the physical environment and use connected computing resources to perform predefined functions upon detection of certain inputs; process data; and transmit the processed data to other computing devices. Smart sensor-based devices are integral to the Internet of Things (IoT), which refers to providing various real-world things, such as streets, buildings, security systems, and household appliances with sensing devices and connecting them through the Internet to achieve remote control or direct communication between these real-world things. The IoT has connected real-world things from electronics to plant and animal wildlife by means of radio frequency identifications (RFIDs), sensors, binary codes, and the like. As a result, virtually all real-world things can be monitored and operated through networking, and their behaviors can be programmed for human convenience.

SUMMARY

Embodiments of the present invention are directed to orchestrating an interruption during the installation of a sensor. A non-limiting example computer-implemented method includes detecting, by a processor, a performance of a step of an installation protocol for a sensor-based device. The processor performs a negative outcome analysis comprising determining a likelihood that the performance of the step will cause a negative outcome. Based at least in part on a result of the negative outcome analysis, an interruption alarm is issued.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods and computer-based systems that monitor a technician's progress during an installation process. In embodiments of the invention, the computer-implemented method includes using a processor to determine if and when an interruption alarm should be transmitted based on a negative outcome analysis. In embodiments of the invention, the negative outcome analysis includes using the processor to make a determination about the likelihood that the technician's actions leading to a negative outcome.

The installation of sensor-based devices raises unique challenges not present during the installation of conventional devices or fixtures. Sensor-based device installation requires, for example, attention to operable connectivity, hardware compatibility with the environment, a power source, absence of unwanted activation signals, and software capability. Furthermore, even though technicians are generally aware of the installation procedures, periodically, the installation is not executed properly, either by forgetting a step, or improperly executing a step. However, even if a misstep in the installation protocol is detected, the issue becomes whether to alert the technician, and how to provide the alert.

One or more embodiments of the present invention address one or more of the above-described shortcomings by providing computer-implemented methods and systems that monitor the installation of a sensor-based device and provide an interruption alarm in situations where actions that either cannot be re-executed or have high re-execution costs are being performed. The interruption alarms are generated based on data (e.g., audio, vibratory, temperature, image) collected during the installation of the sensor-based device. The data is used to map the current installation with prior installations of the same or similar device. In the instance that an action of a technician either cannot be re-executed or have high re-execution costs, and the alert itself will not cause harm to the technician, an interruption alarm is issued.

Figure 1:
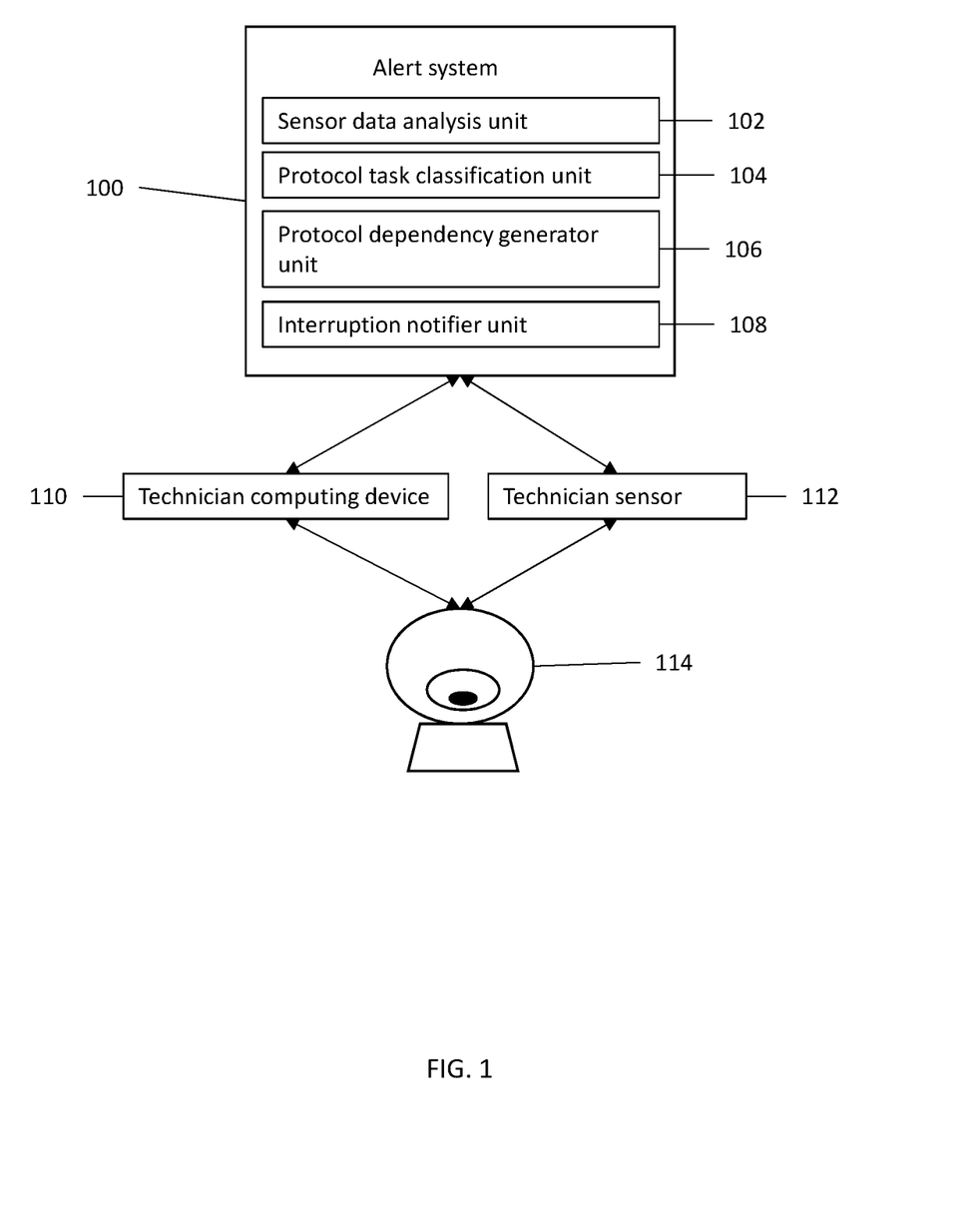
FIG. 1 illustrates a block diagram of components of an alarm system in accordance with one or more embodiments of the present invention.

Turning now to FIG. 1, an interruption alarm system 100 is generally shown in accordance with one or more embodiments of the present invention. The interruption alarm system 100 includes a sensor data analysis unit 102, for storing data collected from a technician sensor 112 and analyzing the data to assist the protocol task classification unit 104. One or more technician sensors 112 are employed to monitor and verify the steps undertaken by a technician during the installation. For example, a wearable sensor, such as a gyroscope and/or an accelerometer, may be used to monitor the wrist movements of a technician to determine when the technician is screwing or unscrewing a screw. Another sensor may include an audio sensor that may record a test sound being emitted from a sensor-based device, or water running near the end of an installation. As described herein, a technician is any person responsible for the installation of a sensor-based device, and therefore can include an employee of a third party service provider, a company employee, or even a property owner.

The protocol task classification unit 104 classifies each step of a current installation, and further monitors whether the technician is following an installation protocol. In general, one or more technician sensors 112 continuously gather data during an installation and further analyze the data to determine whether the technician is following the installation protocol, what is current step of the installation protocol, and whether the technician has deviated from a step of an installation protocol. For example, if the technician is installing a smart fridge, a last step may be to test a water dispenser. An audio-based sensor would monitor for the sound of water to determine whether the dispenser was tested. The technician sensor 112 may include a set of any sensors that help detect the current installation step, includes force-based sensors, audio-based sensors, illumination-based sensors, image capturing sensors, vibration detecting sensors, or any other appropriate sensors. The technician sensor 112 may be a smartwatch used for recording how installers interact with tools, or even multiple sensors. A technician sensor 112 may even be in operable communication with the sensor-based device 114 and monitoring a software on the sensor-based device 114. For example, if a step in an installation protocol is to download an application or cause a wired or wireless network connection, the technician sensor 112 may detect a software being downloaded to the memory of sensor-based device 114 or detect a data packet transfer to determine that the sensor-based device 114 is connected to a communication network.

A protocol dependency generator unit 106 generates a mapping of the dependencies among steps within an installation protocol. A protocol dependency generator unit 106 receives data from protocol task classification unit 104 to determine which steps are being currently performed and generates a dependency graph, in which each node is a step in the installation protocol. Each node is dependent upon a previous node and the dependency is represented by a step in the installation.

The interruption alarm system 100 compares a current installation to stored dependency graphs. Based on the comparison, the interruption alarm system 100 determines whether the technician is following a proper protocol. The protocols used for comparison may vary based on a level of expertise of the technician. For example, a more experienced technician may have a comparison protocol with fewer steps than a less experienced technician. Or the more experienced technician's protocol may include different steps than a less experienced technician. Periodically, a less experienced technician may grasp an installation protocol quicker than would be normally expected. In the event that the alarm system 100 is comparing the current installation steps of the less experienced technician to previous dependency graph(s) of less experienced technician(s), a deviation from a stored installation protocol may not necessarily trigger an interruption alarm. The alarm system 100 may compare then current installation steps to stored installation protocols of more experienced technicians, and based on finding a similarity, determine that the less experienced technician has adopted a more experienced technician's protocol.

It is possible that one or more stored installation protocols include different paths to completion of an installation. It may also be possible that each path has a different probability of leading to a negative outcome in the installation protocol. In this situation, the alarm system may issue a first interruption alarm that signifies that the technician is still following an accepted installation protocol, but that another path with a lesser probability of a negative outcome exists.

It is also possible that a technician creates a new a path that has not been previously stored in the protocol dependency generator unit 106. Regardless of whether the technician is following a stored installation protocol, deviating from a stored installation protocol, or creating a new installation protocol, the sensor data analysis unit 102 is recording the installation. Any new installation protocol is stored in the protocol task classification unit 104, and whether any negative outcomes occurred is cataloged at a later date.

A negative outcome includes a step that cannot be re-executed or have high re-execution costs. For example, installing a camera without securing it with a fastener would cause a technician to have to come back to the property and re-install the camera with the fastener. Although this step could be re-executed, it would cost-intensive for a business. On the other hand, installing a sensor-based device for a one-time use application may not be re-executable, as the negative outcome may not be detected until during the one-time use.

The interruption notifier unit 108 causes an interruption alarm to be issued to a technician. The interruption alarm can be in any form, for example, a ring tone on a mobile phone, a buzzing of a smartwatch, and an LED on a device flashing. The purpose of the interruption alarm is to signal the technician that a step is likely to cause a negative outcome. However, the interruption alarm is also configured to minimize the flow of the installation process and to cause a negative outcome itself. It should be noted that situations exist, in which the alarm system 100 may choose not to cause an interruption alarm to be issued. By comparing the data collected from a technician sensor 112 that issuing an alert may cause harm to a technician. For example, if the step requires that a technician gets on a ladder, the alarm system 100 may choose not to issue an alert. However, in some embodiments, the decision on whether to issue an alert is based on an experience level of a technician. In other words, a technician with a threshold number of installations would receive an interruption alarm, whereas a technician without the threshold would not receive the interruption alarm.

The interruption alert system 100 is in operable communication with a technician computing device 110, which may issue an interruption alarm, include a technician sensor 112, and provide one or more installation protocols to a technician. A technician may communicate with the alarm system 100 via a graphical user interface (not shown) on the technician computing device 110. Through the interface, a technician can view an audio and/or visual depiction of a stored installation protocol. The technician may further view the representation of the current installation protocol that is actually performed by the technician. The technician may also retrieve other stored installation protocols using the technician computing device 110. As the interruption alarm system 100 continuously monitors the technician's progress, it is aware of a current step of the installation protocol. Therefore, if a technician requests an alternative installation protocol, the interruption alarm system 100 provides an installation protocol based on the previously completed steps. For example, if a technician has completed steps one through three of a process, the interruption alarm system 100 would provide one or more installation protocols dependent on steps one through three being completing or at least compatible with steps one through three being completed.

Figure 2:
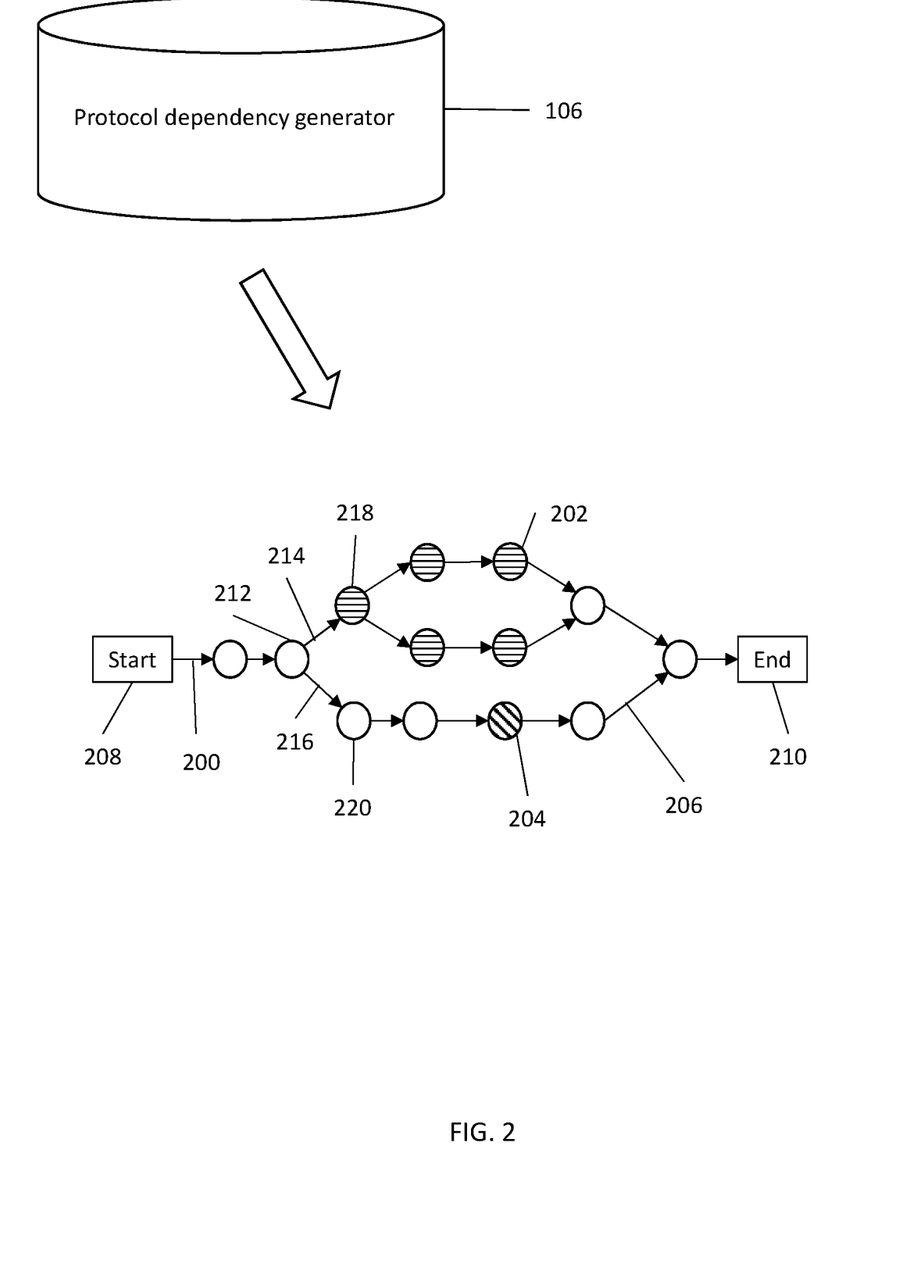
FIG. 2 illustrates a protocol dependency generator and a dependency graph in accordance with one or more embodiments of the present invention.

Referring to FIG. 2, a creation of a dependency graph of an installation protocol by the protocol dependency generator unit 106, according to some embodiments of the present invention, is shown. As a technician sensor 112 collects data of a step being performed, the protocol dependency generator unit 106 creates a first edge 200, which includes a description of the step being performed, any tools being used to perform the step, and a time duration of the step. Each time a new step in performed, a subsequent new edge is generated, and connects to a previous node until the installation is completed 206. Each node is a state of the sensor-based device 114 after completion of a step, and each edge represents a step in the installation protocol. Each state may include a physical state, for example, having a housing removed; or an electrical state, for example, having power or connection to a communication network. Each step is a process required to reach the next state, for example, unscrewing a housing or downloading software. Upon completion of the installation protocol, the interruption alarm system 100 compares the installation protocol with stored installation protocols and combines two or more installation protocols. For example, FIG. 2 shows a combination of three potential installation protocols from the start 208 to end 210.

The interruption alarm system 100 causes an interruption alarm to be emitted based on a step of the installation protocol and/or a state of the sensor-based device 114 to warn a technician that a step may be taken that would likely result in a negative outcome. For example, at low-risk node 212, a technician has two potential next steps 214, 216, according to the stored installation protocols. If the technician chooses step 214, the interruption alarm system 100 may cause an interruption alarm to warn the technician that step 214 will lead to a state 218 that may lead to a negative outcome. In the alternative, if the technician chooses step 216, the technician will likely reach a high-risk node 204. In this case, if the interruption alarm system 100 detects step 216 is being performed, the interruption alarm system 100 may cause an interruption alarm different than the interruption alarm initiated upon detecting step 214. This interruption alarm is different in order to warn the technician of a possibility of a high-risk node 204 in the installation protocol. Therefore, even the high-risk node 204 is multiple steps away from low-risk node 212, it is still dependent upon choosing step 216, and the interruption alarm system 100 issues an interruption alarm upon detecting step 216. In some instances, a technician may deviate from each stored installation protocol in the protocol dependency generator unit 106. However, if the interruption alarm system 100 determines that the sensor-based device 114 is in a state described in node 220, it may still issue the interruption alarm it would have issued if it detected step 216. In this instance, the protocol dependency generator unit 106 would use the technician sensor 112 to collect data during the steps. The collected data would be matched to historical data associated with steps and the newly collected data would be associated with a most likely step taken by the technician. Afterwards, the dependency graph shown in FIG. 2 would be updated to reflect the new edge and any new nodes.

Based on historical data from stored installation protocols, the protocol dependency generator unit 106 performs a negative outcome analysis and assigns a risk probability for each node. In this illustration, low-risk nodes 212 are illustrated as blank. A low-risk node 212 includes a state with a probability of a negative outcome below a first threshold value. Medium-risk nodes 202 are illustrated as having horizontal lines, and describe nodes with a probability of a negative outcome greater than the first threshold value, but lower than a second threshold value. High-risk nodes 204 are illustrated as having slanted lines and having a probability of a negative outcome greater than the second threshold value. Even though two nodes may both be a same risk node, the probability of a negative outcome for each node may be different based on the state of the sensor-based device 114.

Figure 3:
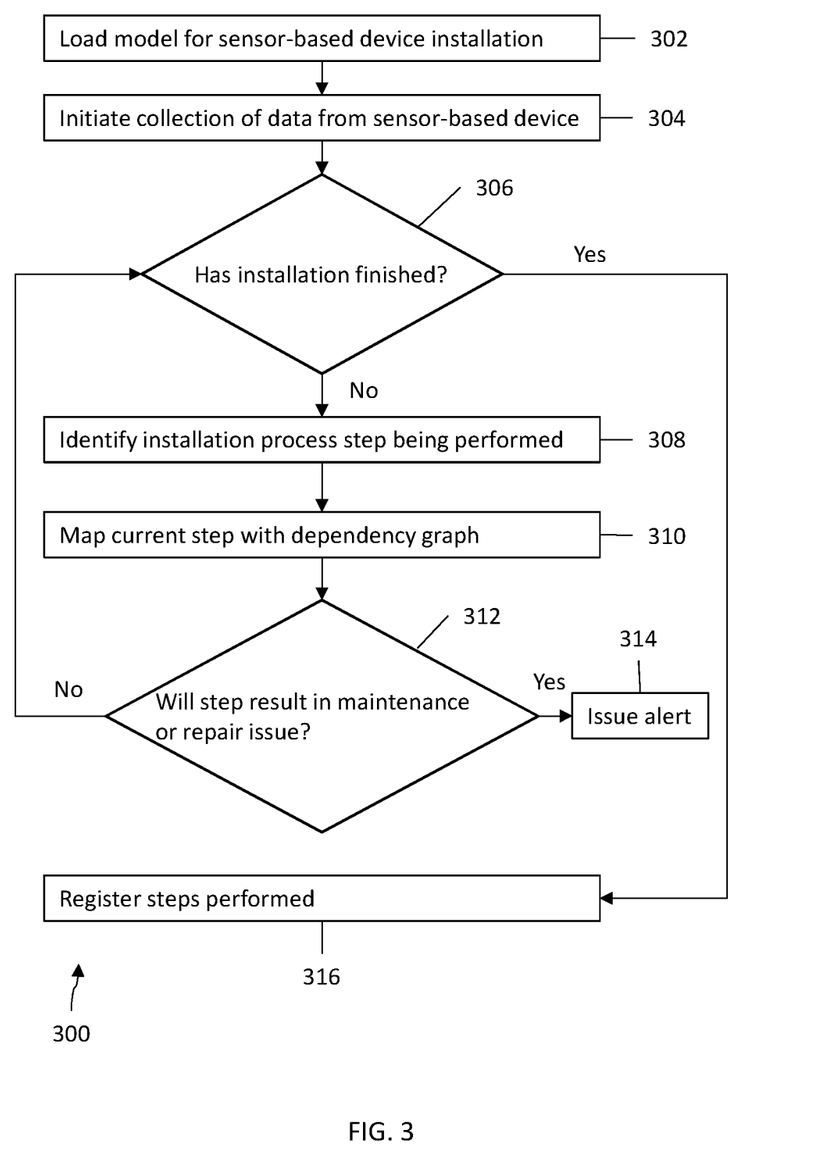
FIG. 3 illustrates a flow diagram of a computer-implemented method for creating an installation protocol in accordance with one or more embodiments of the present invention.

Referring to FIG. 3, a flow diagram 300 of a computer-implemented method for creating an issuing an interruption alarm in accordance with one or more embodiments of the present invention is shown. At block 302, a model of a sensor-based device to be installed is loaded onto a system. The model includes various schematics, functionalities, and hardware and software descriptions of the sensor-based device. The model is also used to associate stored installation protocols of the sensor-based device. At block 304, at least one sensor associated with a technician is used to collect data of each step of installation and each state of the sensor-based device being installed. At block 306, the system determines whether the installation is complete, by either receiving an input from the technician or based on a lack of change in the collected data for a threshold period of time. If the installation has completed, the system registers the steps performed during installation at block 316. If the installation has not completed, the system identifies a current step being performed during installation at block 308. At block 310 the system, maps a current step with a step from a stored installation protocol. At block 312, the system performs a negative outcome analysis to determine whether the step will likely cause a negative outcome. If the step is not likely to result in a negative outcome, the system returns to block 306. If, however, the system is likely to result in a negative outcome, the system will cause an interruption alert to be issued at block 314.

Figure 4:
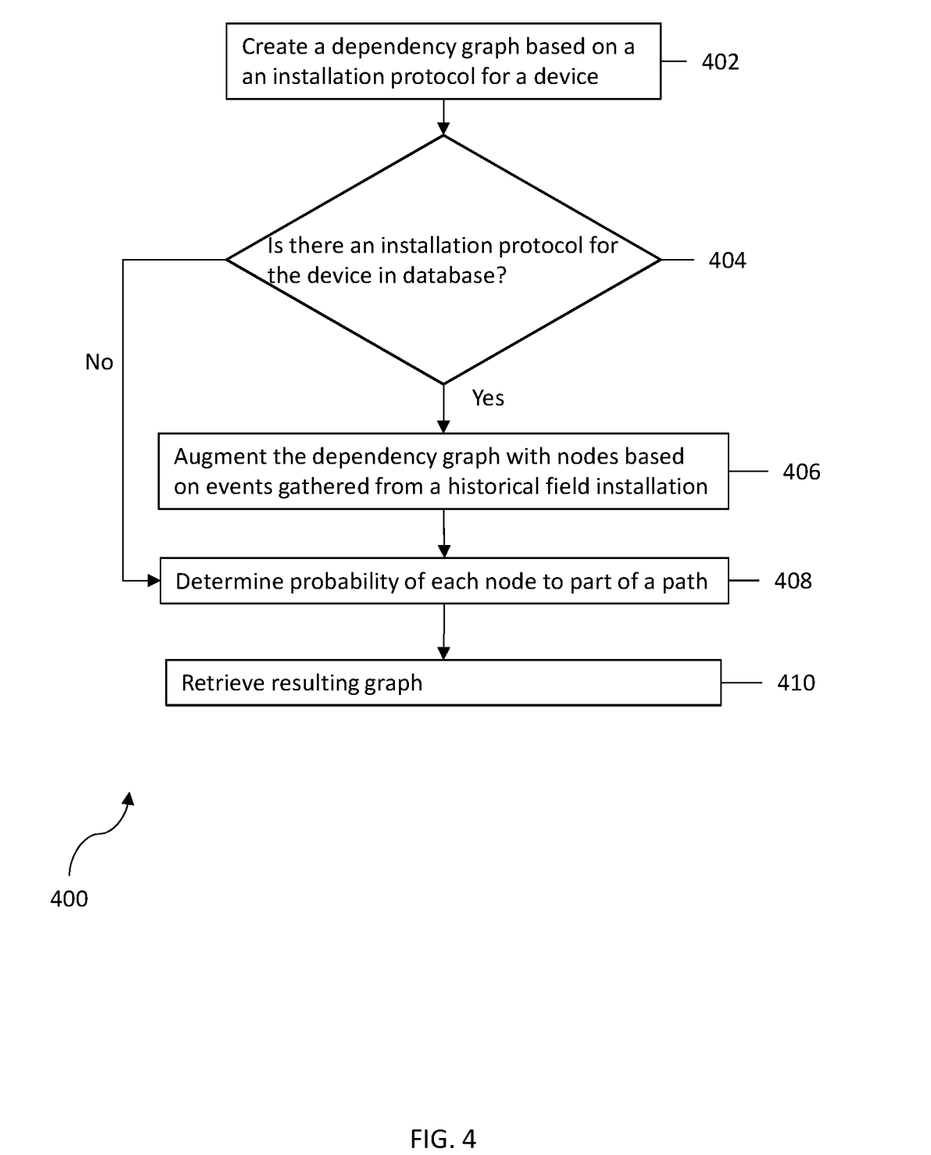
FIG. 4 illustrates a flow diagram of a computer-implemented method for building a dependency graph in accordance with one or more embodiments of the present invention.

Referring to FIG. 4, a flow diagram 400 of a computer-implemented method for building a dependency graph for a sensor-based device installation in accordance with one or more embodiments of the present invention is shown. At block 402, the system generates an installation protocol for a sensor-based device (assembly and configuration instructions) using natural language processing (NLP) techniques to parse the installation text files, and group related tasks using numbers or sequences. At block 404, the system searches a database for one or more similar stored installation protocols. If there are one or more similar installation protocol, any deviations of the determined installation protocol, from the one or more similar stored installation protocols, is used to augment the one or more similar installation protocols at block 406. At block 408, the system performs a negative outcome analysis and calculates a new or updated likelihood of each step in the one or more augmented stored installation protocols leading to a negative outcome. The likelihood may be calculated using historical data of similar sensor-based device installations and the outcomes of each installation. By comparing the steps of similar and different installation protocols and the dependencies between steps of a protocol, the system can assign individual probability values to each step of an installation protocol. At block 410, the system retrieves the one or more augmented installation protocols with the calculated probabilities for a technician.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
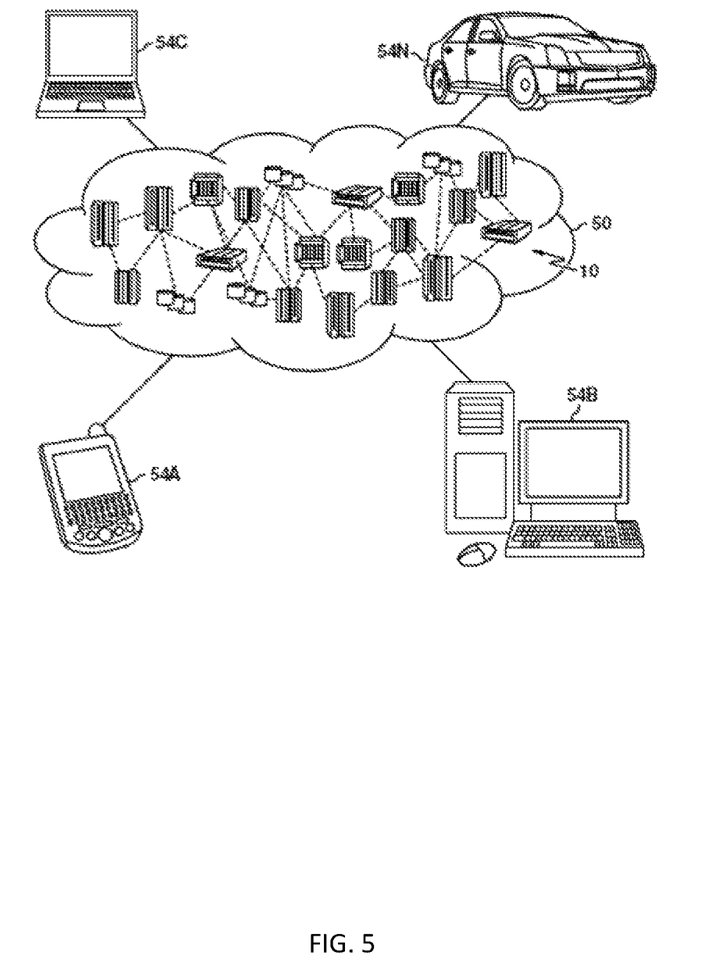
FIG. 5 depicts a cloud computing environment according to one or more embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
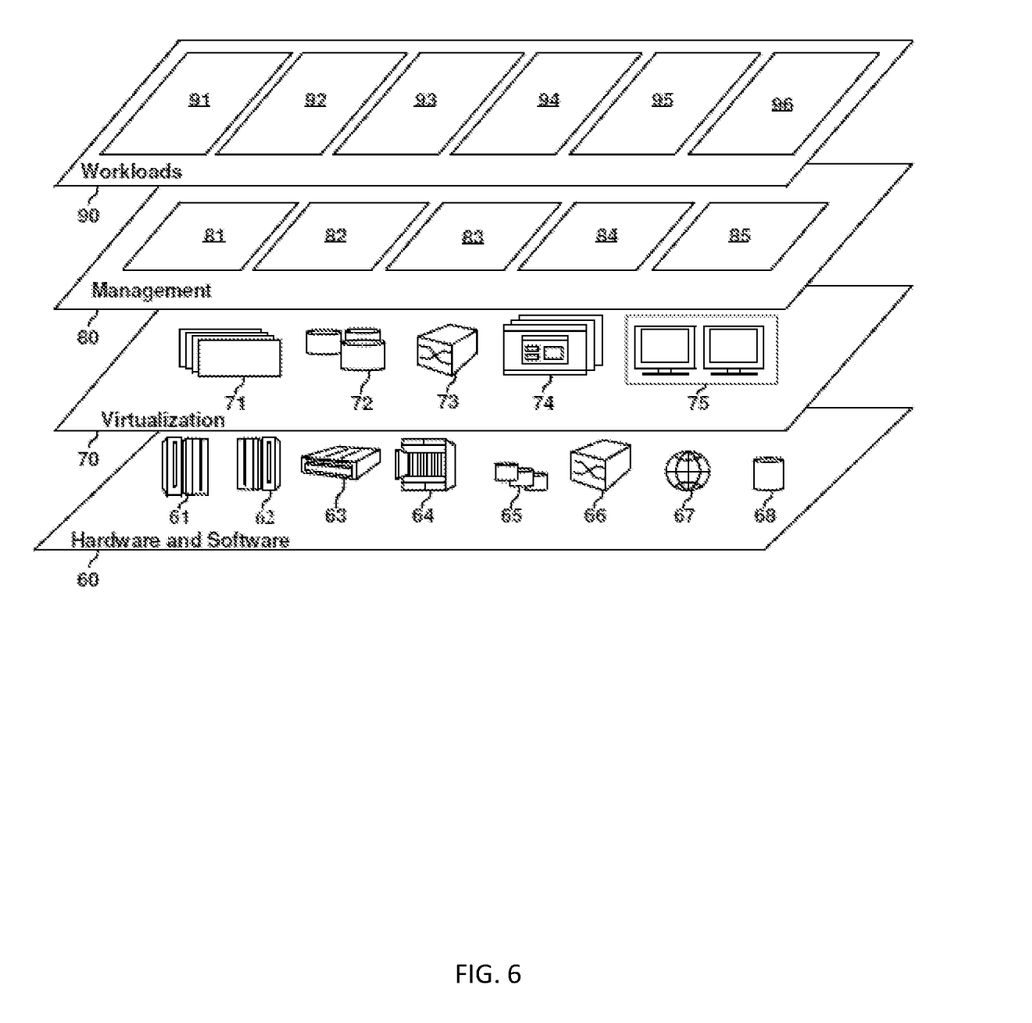
FIG. 6 depicts abstraction model layers according to one or more embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and causing an interruption alarm 96.

Figure 7:
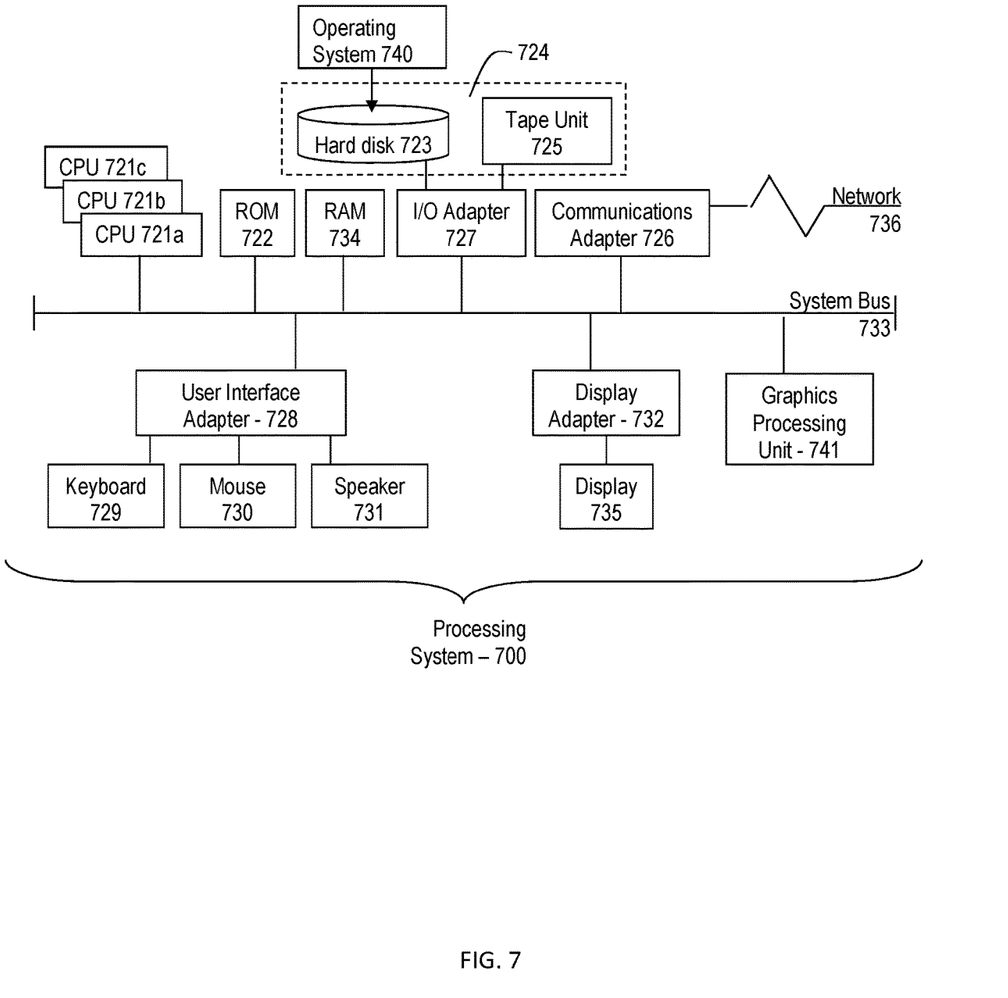
FIG. 7 depicts a block diagram of a computer system for use in implementing one or more embodiments of the present invention.

It is understood that the present disclosure is capable of being implemented in conjunction with any other type of computing environment now known or later developed. For example, FIG. 7 depicts a block diagram of a processing system 700 for implementing the techniques described herein. In examples, the processing system 700 has one or more central processing units (processors) 721*a*, 721*b*, 721*c*, etc. (collectively or generically referred to as processor(s) 721 and/or as processing device(s)). In aspects of the present disclosure, each processor 721 can include a reduced instruction set computer (RISC) microprocessor. Processors 721 are coupled to system memory (e.g., random access memory (RAM) 724) and various other components via a system bus 733. Read only memory (ROM) 722 is coupled to system bus 733 and may include a basic input/output system (BIOS), which controls certain basic functions of the processing system 700.

Further depicted are an input/output (I/O) adapter 727 and a network adapter 726 coupled to the system bus 733. I/O adapter 727 may be a small computer system interface (SCSI) adapter that communicates with a hard disk 723 and/or a storage device 725 or any other similar component. I/O adapter 727, hard disk 723, and storage device 725 are collectively referred to herein as mass storage 734. Operating system 740 for execution on processing system 700 may be stored in mass storage 734. The network adapter 726 interconnects system bus 733 with an outside network 736 enabling processing system 700 to communicate with other such systems.

A display (e.g., a display monitor) 735 is connected to the system bus 733 by display adapter 732, which may include a graphics adapter to improve the performance of graphics intensive applications and a video controller. In one aspect of the present disclosure, adapters 726, 727, and/or 732 may be connected to one or more I/O busses that are connected to the system bus 733 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 733 via user interface adapter 728 and display adapter 732. An input device 729 (e.g., a keyboard, a microphone, a touchscreen, etc.), an input pointer 730 (e.g., a mouse, trackpad, touchscreen, etc.), and/or a speaker 731 may be interconnected to system bus 733 via user interface adapter 728, which may include, for example, a Super I/O chip integrating multiple device adapters into a single integrated circuit In some aspects of the present disclosure, the processing system 700 includes a graphics processing unit 737. Graphics processing unit 737 is a specialized electronic circuit designed to manipulate and alter memory to accelerate the creation of images in a frame buffer intended for output to a display. In general, graphics processing unit 737 is very efficient at manipulating computer graphics and image processing and has a highly parallel structure that makes it more effective than general-purpose CPUs for algorithms where processing of large blocks of data is done in parallel Thus, as configured herein, the processing system 700 includes processing capability in the form of processors 721, storage capability including system memory (e.g., RAM 724), and mass storage 734, input means such as keyboard 729 and mouse 730, and output capability including speaker 731 and display 735. In some aspects of the present disclosure, a portion of system memory (e.g., RAM 724) and mass storage 734 collectively store the operating system 740 to coordinate the functions of the various components shown in the processing system 700.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   detecting, by a processor, a performance of a step of an installation protocol for a sensor-based device;
   performing, by the processor, a negative outcome analysis comprising determining a likelihood that the performance of the step will cause a negative outcome; and
   based at least in part on a result of the negative outcome analysis, issuing an interruption alarm,
   wherein determining the likelihood that the performance of the step will cause the negative outcome comprises:
   creating, by the processor, during installation of the sensor-based device, a dependency graph that describes the installation protocol, wherein each node of the dependency graph describes a respective state of the sensor-based device and each edge of the dependency graph describes a respective step of the installation protocol;
   correlating, by the processor, the created dependency graph with one or more similar stored dependency graphs, wherein each node of the similar stored dependency graphs includes a respective probability of a negative outcome; and
   determining, by the processor, a respective probability of a negative outcome of each node of the created dependency graph, based at least in part on the stored probabilities and a dependency between the nodes of the created dependency graph.

2. The computer-implemented method of claim 1 further comprising:
   detecting a deviation in a step from one or more stored dependency graphs; and
   augmenting the one or more stored dependency graphs to include the deviated step.

3. The computer-implemented method of claim 1, wherein detecting the performance of the step comprises:
   receiving, via a technician sensor, a signal associated with performance of the step; and
   correlating the signal with a stored signal and associated step.

4. The computer-implemented method of claim 1, wherein a type of alarm is based at least in part on the probability of the negative outcome.

5. The computer-implemented method of claim 1, wherein issuing the interruption alarm is based at least in part on a level of experience of the technician.

6. The computer-implemented method of claim 1, wherein issuing the interruption alarm is based at least in part on probable impact on the technician during installation.

7. A system comprising:
a memory having computer readable instructions; and
one or more processors for executing the computer readable instructions, the computer readable instructions controlling the one or more processors to perform operations comprising:
detecting, by a processor, a performance of a step of an installation protocol for a sensor-based device;
performing, by the processor, a negative outcome analysis comprising determining a likelihood that the performance of the step will cause a negative outcome; and
based at least in part on a result of the negative outcome analysis, issuing an interruption alarm,
wherein determining the likelihood that the performance of the step will cause the negative outcome comprises:
creating, by the processor, during installation of the sensor-based device, a dependency graph that describes the installation protocol, wherein each node of the dependency graph describes a respective state of the sensor-based device and each edge of the dependency graph describes a respective step of the installation protocol;
correlating, by the processor, the created dependency graph with one or more similar stored dependency graphs, wherein each node of the similar stored dependency graphs includes a respective probability of a negative outcome; and
determining, by the processor, a respective probability of a negative outcome of each node of the created dependency graph, based at least in part on the stored probabilities and a dependency between the nodes of the created dependency graph.

8. The system of claim 7, wherein the operations further comprising:
detecting a deviation in a step from one or more stored dependency graphs; and
augmenting the one or more stored dependency graphs to include the deviated step.

9. The system of claim 7, wherein detecting the performance of the step comprises:
receiving, via a technician sensor, a signal associated with performance of the step; and
correlating the signal with a stored signal and associated step.

10. The system of claim 7, wherein a type of alarm is based at least in part on the probability of the negative outcome.

11. The system of claim 7, wherein issuing the interruption alarm is based at least in part on a level of experience of the technician.

12. The system of claim 7, wherein issuing the interruption alarm is based at least in part on probable impact on the technician during the installation.

13. A computer program product comprising a computer readable storage medium having program instructions embodied therewith, the program instructions executable by a processor to cause the processor to perform operations comprising:
detecting, by a processor, a performance of a step of an installation protocol for a sensor-based device;
performing, by the processor, a negative outcome analysis comprising determining a likelihood that the performance of the step will cause a negative outcome; and
based at least in part on a result of the negative outcome analysis, issuing an interruption alarm,
wherein determining the likelihood that the performance of the step will cause the negative outcome comprises:
creating, by the processor, during installation of the sensor-based device, a dependency graph that describes the installation protocol, wherein each node of the dependency graph describes a respective state of the sensor-based device and each edge of the dependency graph describes a respective step of the installation protocol;
correlating, by the processor, the created dependency graph with one or more similar stored dependency graphs, wherein each node of the similar stored dependency graphs includes a respective probability of a negative outcome; and
determining, by the processor, a respective probability of a negative outcome of each node of the created dependency graph, based at least in part on the stored probabilities and a dependency between the nodes of the created dependency graph.

14. The computer program product of claim 13, wherein the operations further comprise:
detecting a deviation in a step from one or more stored dependency graphs; and
augmenting the one or more stored dependency graphs to include the deviated step.

15. The computer program product of claim 13, wherein detecting the performance of the step comprises:
receiving, via a technician sensor, a signal associated with performance of the step; and
correlating the signal with a stored signal and associated step.

16. The computer program product of claim 13, wherein a type of alarm is based at least in part on the probability of the negative outcome.

17. The computer program product of claim 13, wherein issuing the interruption alert is based at least in part on a level of experience of the technician.

* * * * *